No. 635,041. Patented Oct. 17, 1899.
J. GEORGE & C. M. SHORTLE.
APPARATUS FOR MANUFACTURING GLASS.
(Application filed Dec. 23, 1898.)
(No Model.)
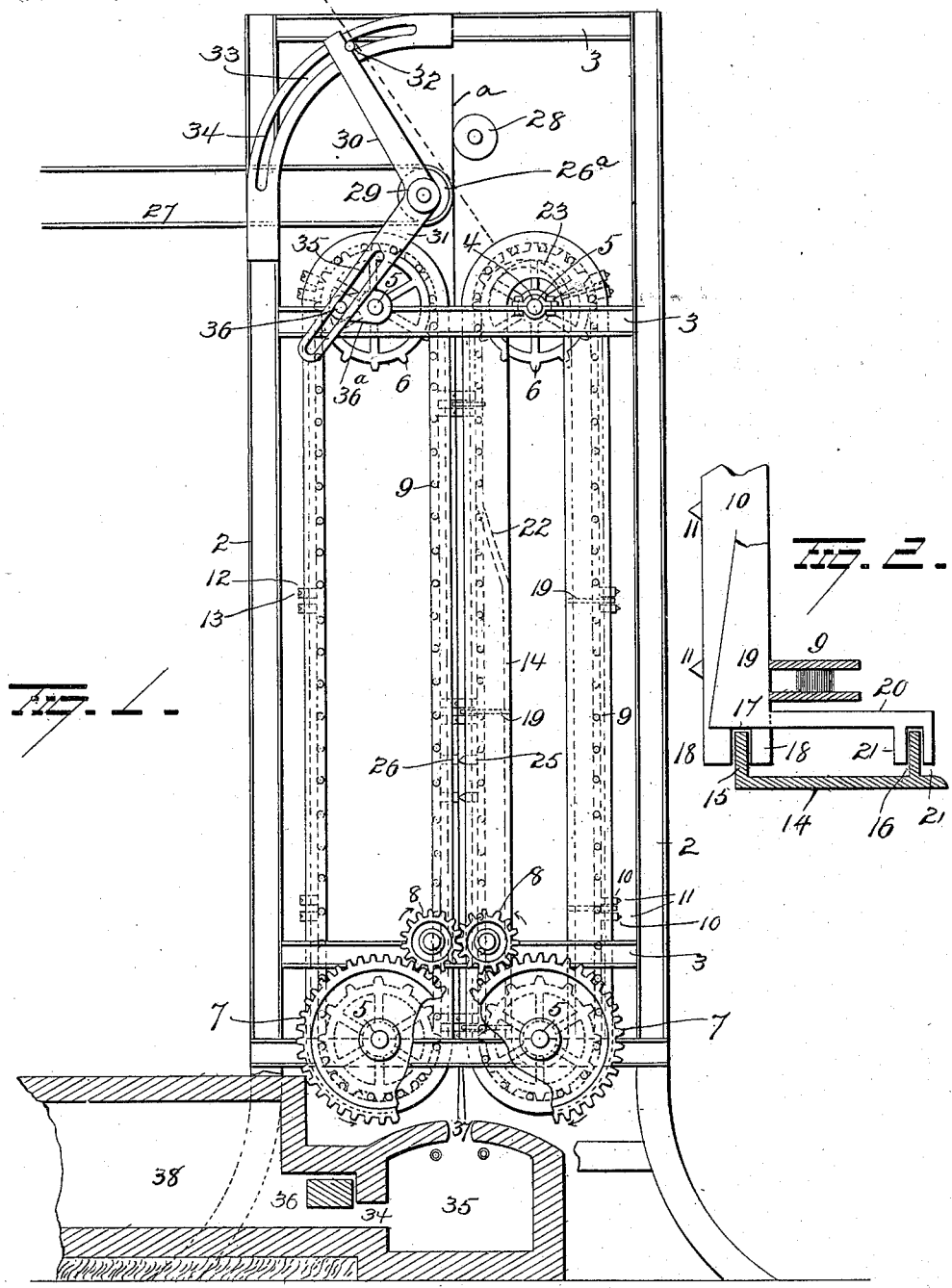
WITNESSES
INVENTORS
J. George
C. M. Shortle
By H. A. Seymour Attorney

United States Patent Office.

JAPHUS GEORGE, OF ITHACA, AND CHRISTOPHER M. SHORTLE, OF BERNHARD'S BAY, NEW YORK.

APPARATUS FOR MANUFACTURING GLASS.

SPECIFICATION forming part of Letters Patent No. 635,041, dated October 17, 1899.

Application filed December 23, 1898. Serial No. 700,139. (No model.)

*To all whom it may concern:*

Be it known that we, JAPHUS GEORGE, of Ithaca, in the county of Tompkins, and CHRISTOPHER M. SHORTLE, of Bernhard's Bay, in the county of Oswego, State of New York, have invented certain new and useful Improvements in Apparatus for the Manufacture of Glass; and we do hereby declare the following to be a full, clear, and exact description of the invention, such as will enable others skilled in the art to which it appertains to make and use the same.

Our invention relates to an improvement in an apparatus for making sheet-glass, the object of the invention being to provide an apparatus that will operate to automatically draw a continuous sheet of glass, cut the glass into lengths, and convey the sheets of glass to a depository.

A further object is to provide an apparatus that will greatly lessen the cost of manufacture of sheet-glass.

A further object is to provide an apparatus for drawing sheet-glass which will be comparatively simple in construction, entirely automatic in its operation, and most effectual when in use.

With these objects in view the invention consists in certain novel features of construction and combinations and arrangements of parts, as will be more fully hereinafter described, and pointed out in the claims.

In the accompanying drawings, Figure 1 is a view, partly in section, illustrating our improvements; and Fig. 2 is a detail view of a clutch, guide, and knife.

1 represents a frame which is preferably made of metal and comprises uprights or standards 2 and cross pieces or braces 3. The lower ends of the uprights or standards are preferably curved outward, as shown, whereby to more firmly support the apparatus in place. Four of these cross-pieces 3 are provided with suitable bearings 4 for the reception of shafts 5, each cross-piece having two of such bearings and shafts. A sprocket-wheel 6 is secured at the end of the shafts 5, and intermeshing gear-wheels 7 are secured to the lower shafts. Suitable gears 8 are adapted to mesh with the gear-wheels 7, and said gears 8 are adapted to be operated by any approved means. Endless sprocket-chains or steel bands 9 are disposed around each vertical pair of sprocket-wheels, whereby the inner edges of each pair of chains are disposed parallel to and a short distance from each other. Clutch-sections 10 are secured at intervals on the pairs of chains to one side of the frame and are provided with projections or teeth 11, and clutch-sections 12 are secured to the opposite pair of chains and are provided with indentations or sockets 13 for the reception of the projections or teeth 11 to securely wedge the glass therein and prevent any possibility of slipping. A track or guideway 14 is provided and is similar in shape to the position of the endless chains, or, in other words, having rounded upper and lower ends and straight parallel upright sides. The track or guideway 14 is provided with endless guides or beads 15 16, extending around the track or guideway, the guides or beads 15 being disposed in recesses 17 or between parallel arms 18 on the ends of the clutches 10 and 12, whereby to effectually guide same and insure their proper position with relation to each other. A knife or cutter 19 is disposed between each pair of clutches 10, and each knife is provided with rearwardly-extending arms 20, having parallel lugs 21 disposed at right angles, whereby to receive the guide or bead 16 on the track or guideway 14. The guide or bead 16 is approximately parallel with the guide 15 throughout its length, except at a point near the upper end of the inner side of the track or guideway, where the guide 16 inclines, as shown at 22, and merges into the guide 15 and again diverges therefrom at the upper curved portion of the guideway or track, as shown at 23. It will be readily seen that when the knife reaches the inclined portion 22 it will be forced forward through the sheet of glass, and hence cut the same, and when the knife reaches the diverging portion 23 it will be withdrawn from beneath the edge of the cut section and permit the sheet of glass to be carried off by means of an endless carrier 27, which will be more fully hereinafter described. It will also be seen that we can employ any number of these clutches 10 12 and knives 19 on the endless chains, according to the length of the sheet of glass to be cut.

Clutch-sections 25, having projections or teeth thereon, may be disposed on one series of chains, and clutch-sections 26, having indentations therein, may be disposed on the other series of chains, whereby to prevent the glass curling or drawing at its edges.

A roller $26^a$ is revolubly mounted in the upper portion of the frame 1 and is disposed so that its peripheral face will be in alinement with the path of the sheet of glass $a$, and an endless belt or carrier 27 is passed around said roller and extends outward from the frame to any desired point for depositing the sheets of glass, where a roller (not shown) is provided for the belt or carrier. An idle-roller 28 is also mounted in the frame, above the roller $26^a$, and has one edge in alinement with the path of the upwardly-moving glass and, together with the roller $26^a$, is adapted to temporarily hold the glass $a$ in a perpendicular position. Levers 29 are pivotally connected to the frame 1 and are provided with two members 30 31, disposed at right angles to each other. The members 30 are connected at their upper ends by means of a cross piece or rod 32, which is disposed in curved elongated slots 33 in guides 34, disposed on opposite sides of the frame. The other member 31 is provided with an elongated slot or guide 35, adapted to receive a crank-pin 36, projecting from a crank-arm $36^a$ on the shaft of the sprocket-wheel 6, whereby to move said lever 29.

It will be seen that when a sheet of glass $a$ is cut and forced upward between the rollers $26^a$ and 28 the members 30 of the levers 29 will be moved over and rest flat against the glass, and as the sprocket-wheels turn and convey the cutter and clutches to one side they will also gradually lower the member 30 of the lever 29 and incline the sheet of glass, when it will be entirely supported on the lever 29 until the endless carrier 27 is reached, when the glass will be deposited thereon and be conveyed to any desired depository. The lever 29 will then be returned to take another sheet of glass, and the operation will be repeated indefinitely.

Any approved melting-furnace 38 may be employed and provided with an opening 34 to permit the passage of molten glass into the draft-tank 35. A float-block 36 is preferably disposed in front of said opening 34, whereby to prevent any solid particles from passing into the draft-tank. A draft slot or opening 37 is provided in the upper portion of the draft-tank, and suitable cooling-pipes may be provided in proximity to said opening to cool the glass sufficiently to prevent its being drawn out too thin.

The operation of our improved apparatus is as follows: When the apparatus is first started, we take a bar or strip of iron having asbestos secured at its edge, the bar or strip just the width of the glass to be drawn, and insert the bar into the molten glass and permit the clutches 10 and 12 to clutch the asbestos, when the clutches will be drawn up and the glass will be clutched by the next succeeding clutches and the operation will have been started. As the continuous sheet of glass is being drawn from the draft-tank 35 it will be cut by the cutters 19 when they reach the inclined guide 22, and the several sheets resting on the knife will be conveyed upward between the rollers $26^a$ and 28, and as the cutters move around the sprocket-wheel 6 it will throw the lower edge of the glass outward and assist the lever 29, which has in the meantime moved over to receive the glass to lower the same. The glass is then deposited on the endless carrier 27 and conveyed to any desired depository.

It will be seen that the operation of our improved apparatus after it is once started is a continuous one as long as any glass remains in the draft-tank 35 and entirely automatic and that sheets of glass can be made quickly, and hence cheaply, with our improved apparatus, and our apparatus will insure a uniform size and thickness to the sheets of glass.

Various slight changes might be resorted to in the general form and arrangement of the several parts described without departing from the spirit and scope of our invention, and hence we would have it understood that we do not wish to limit ourselves to the precise details set forth, but consider ourselves at liberty to make such slight changes and alterations as fairly fall within the spirit and scope of our invention.

Having fully described our invention, what we claim as new, and desire to secure by Letters Patent, is—

1. The combination of means for drawing a sheet of glass from a molten mass, means for automatically subdividing said drawn sheet and means for receiving and automatically discharging the subdivided sections of glass, all of said means coöperating in a single apparatus.

2. The combination of drawing and elevating means, a cutter actuated automatically by said drawing and elevating means and means also actuated by the drawing and elevating means adapted to receive and discharge severed sections of glass.

3. The combination with upper and lower sprocket-wheels, of parallel elevators passing over said sprocket-wheels and carrying means for engaging and elevating glass, a cutter, a discharging device for severed sections of glass, a crank-arm on said discharging device and a crank-arm on the journal of one of the sprocket-wheels and adapted to operate the crank-arm on the discharging device.

4. In an apparatus for drawing glass, the combination with a frame, of endless carriers in said frame, clutches on said carriers, knives on said carriers and means for operating said clutches and knives.

5. The combination with a frame, of endless carriers adapted to convey a sheet of glass mounted in said frame, clutches on said carriers, knives or cutters on said carriers guides in said frame for said clutches and knives and means on said guides for forcing the knives through the glass carried by said carriers.

6. The combination with a frame, of vertically-disposed endless carriers spaced a short distance apart, coöperating clutch-sections on said carriers, knives disposed between each pair of clutches on one conveyer and means in said frame for guiding said clutches and operating said knives.

7. The combination with a frame, of parallel upright endless carriers spaced apart, coöperating clutch-sections on the respective carriers, knives between the clutches on one carrier, an endless guide for said clutches and knives and means for conveying the glass away after it has been cut.

8. The combination with a frame, of means for drawing sheet-glass, automatically-operating means for cutting the glass into sections, a conveyer connected with said frame, a discharging device mounted in proximity to said conveyer and adapted to receive the severed sections of glass and means adapted to automatically operate said discharging device to deliver the severed section of glass to the conveyer.

9. The combination with a frame, of sprocket-wheels mounted in said frame in vertical pairs, endless sprocket-chains passing around each pair of sprocket-wheels, clutches and knives on said chains, guides in said frame for guiding said clutches and knives and said guide inclining at a point in its path to force said knives through the sheet of glass carried by the clutches.

10. The combination with a frame, of pairs of endless carriers disposed in said frame, of coöperating clutch-sections arranged in pairs on said carriers, knives disposed between the pairs of clutch-sections on one carrier, guides in said frame for said clutches and knives, the guide for the knives inclined at a point in its path whereby to force said knives through the glass to cut the same and a second inclined portion in said knife-guide to return the knife to its normal position.

11. In an apparatus for making sheet-glass, the combination with vertically-movable clutch-sections and a knife, of means for automatically manipulating said clutch-sections and knife to draw a sheet of glass and cut it and then release the severed sheet and means constructed and arranged to receive the severed sheet and deposit it automatically.

12. In an apparatus for making sheet-glass, the combination with a series of coöperating clutch-sections, of means for continuously raising said clutch-sections and causing them to grasp and draw a sheet of glass and afterward release the same, knives and means operating automatically to manipulate said knives to sever the sheets of glass before they are released by the clutches.

In testimony whereof we have signed this specification in the presence of two subscribing witnesses.

JAPHUS GEORGE.
CHRISTOPHER M. SHORTLE.

Witnesses:
CLARENCE STIVENS,
JOHN N. MEAD.